May 22, 1923.

E. B. KILLEN

PNEUMATIC TIRE

Filed Aug. 20, 1920

E. B. KILLEN

PNEUMATIC TIRE

Filed Aug. 20, 1920

Inventor-
Edward Brice Killen,
By- B. Singer. Atty

Patented May 22, 1923.

1,456,062

UNITED STATES PATENT OFFICE.

EDWARD BRICE KILLEN, OF LONDON, ENGLAND.

PNEUMATIC TIRE.

Application filed August 20, 1920. Serial No. 404,840.

*To all whom it may concern:*

Be it known that I, EDWARD BRICE KILLEN, of 27 Queen Victoria Street, London, E. C. 4, England, engineer, have invented certain new and useful Improvements in or Relating to Pneumatic Tires, of which the following is a specification.

This invention is specially suitable when constructing "Giant" inflated types of tires, and when used it enables an abnormal flexing or cushioning effect to be safely obtained when running on the road, combined with a much lower weight, greater strength and cheaper first cost, besides other advantages.

In order that my invention may be properly understood and readily carried into effect, I have hereunto appended three sheets of drawings, of which—

Figure 1:
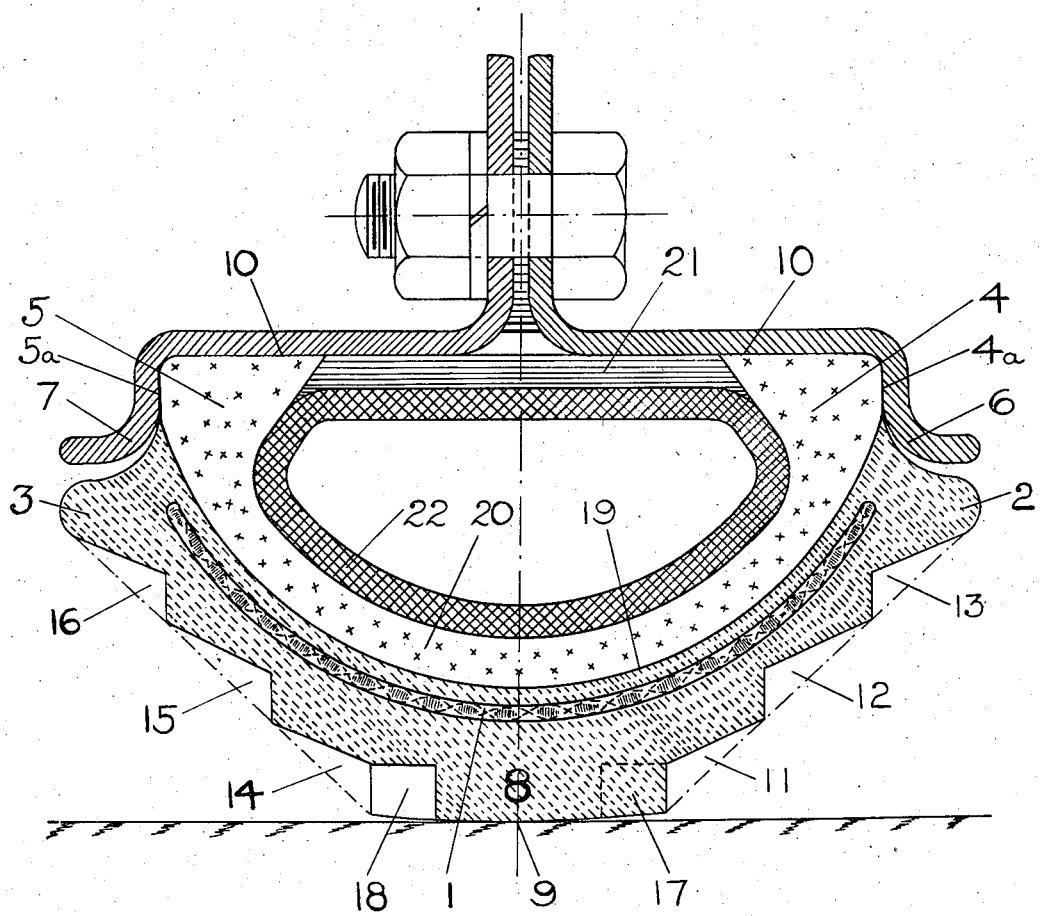
Figure 1 shows a cross-section of my type of inflated tire in which the whole cover of the tire which appears outside the tire's metal retaining rims or flanges forms a wide gable-like tread having a blunt treading apex and right and left inextensible base beads, the strong foundation of the tire cover being less than a semi-circle.

The tire cover 1 has what I will call three main parts, namely, an abnormally wide shock-absorbing tread 2 and 3, and right and left inextensible base beads 4 and 5. In this invention the whole of the tire cover 1 which is above or outside the wheel's metal tire retaining rims or flanges 6 and 7, is constructed to be a shock-absorbing tread and is more or less triangular in shape in cross-section, having a suitable flexible blunt apex or extreme circumference part 8 formed on and about the tire's centre line 9. The whole of the tire's cover in cross-section which extends beyond the wheel's tire retaining metal rims or flanges 6 and 7 is practically triangular in shape, but having a flexible blunt treading apex or extreme circumference 8, equal right and left sides, and a suitable base part. The base part has right and left inextensible base beads 4 and 5 which base beads have preferably straight outer sides 4ª and 5ª and are capable of being snugly fitted over the metal bed circumference 10 of a suitable wheel.

This type of tire, when used, enables chassis to travel over all types of roads and negotiate soft as well as hard ground, and to take farm produce over soft ground, the wide gable-like tread being abnormally wide in effect on soft ground, and narrow in effect when travelling on hard or good roads, as and when required, and on each gable-like side of the wide tread are preferably formed suitable endless grooves 11—12—13 and 14—15—16 or cavities when required, which facilitate the tread flexing abnormally, and on the blunt apex or extreme circumference part 8 are formed suitable cavities 17 and 18, and grooves when required. This gable-like construction of tread enables a non-skidding effect to be obtained in road or ground contact. With this tire a great circumferential road contact is obtained under both light and heavy loads, but with increase of load on good or hard roads the tread is narrow for the greater part of its work, thereby bringing into road contact a greater circumferential area of tire wall to carry the heavier loads, and actually increasing the tire's effective strength with increase of load, as and when required, see Figure 1. In other words, the effectual increase of tire width is held in reserve to deal with excessive overloads or abnormal road shocks, as and when required, see Figures 2 and 3.

Figure 2:
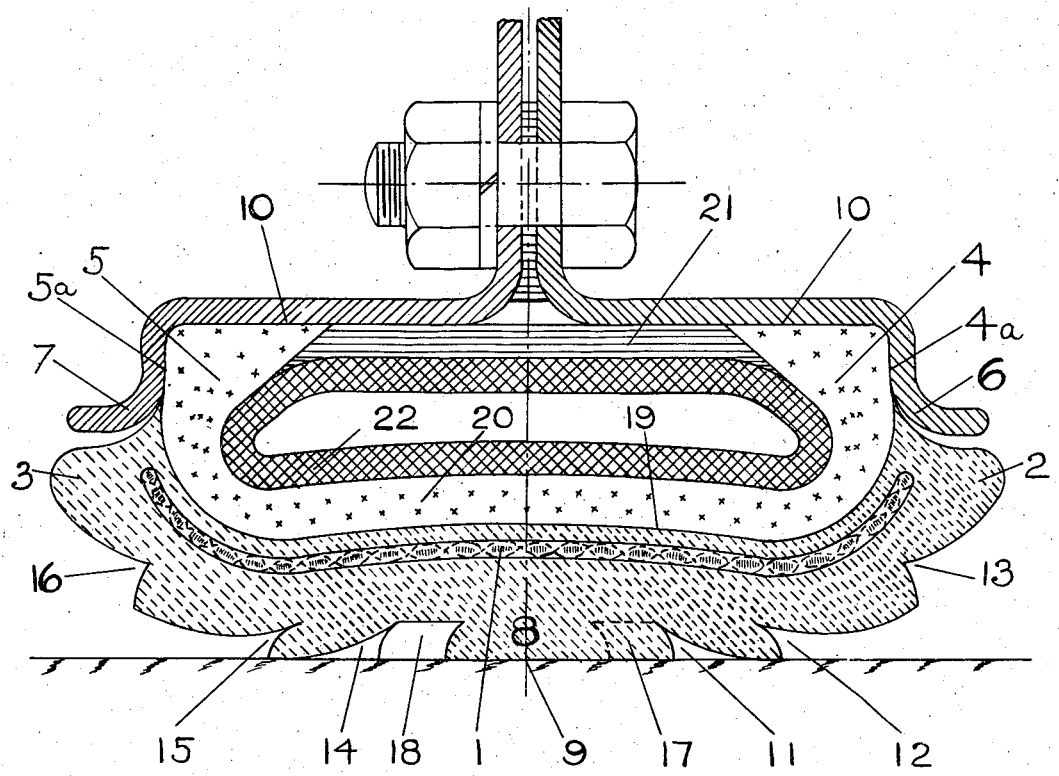
Figure 2 is a similar cross-section to Figure 1 showing my tire under say an inch give or deflection in road contact.
Figure 3:
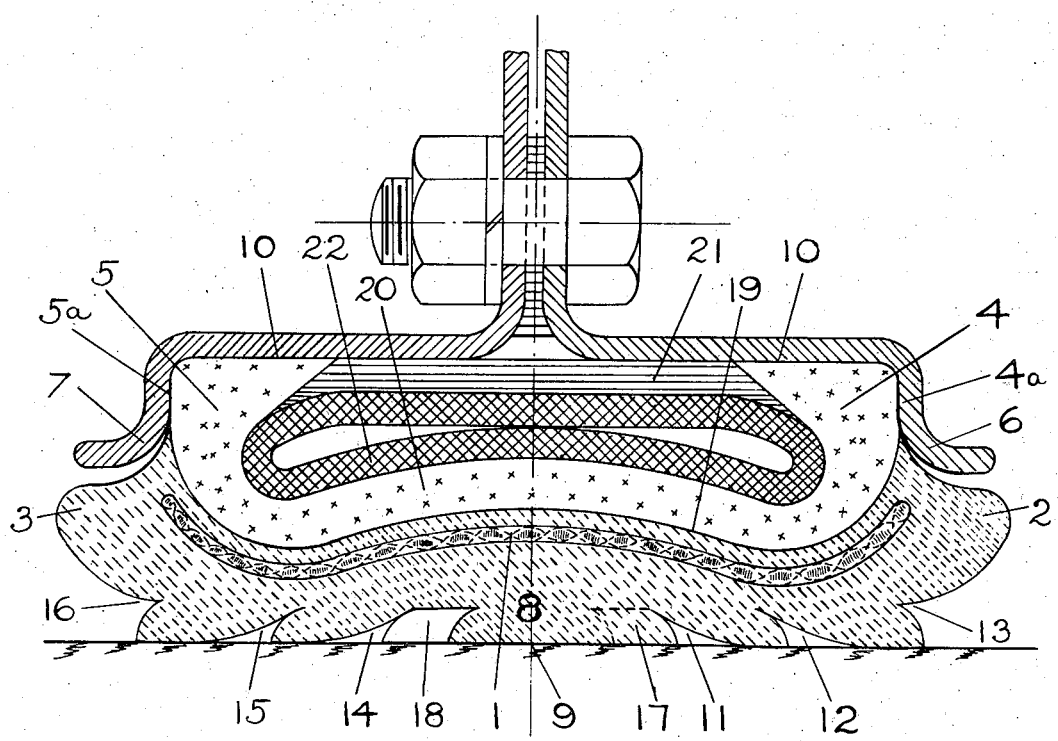
Figure 3 is a similar cross-section to Figure 1 and Figure 2 showing my tire absorbing abnormal road shocks or being overloaded or running under-inflated or actually deflated.

This construction of tire cover enables a relatively narrow effective tread to be in road contact when carrying light loads, see Figure 1, but when the tire is overloaded the effective width of the tire when in road contact may be automatically increased two or three times as and when required, being self-adjusting to the load carried or shock received, and sensitive under minimum loads, see Figures 1, 2 and 3. When overloaded this tire acquires increased effective strength to carry the overload, up to its maximum carrying capacity, see Figure 3.

The extreme height of the tire cover in cross-section may be a quarter of an inch more than half its extreme width when manufactured in sizes 4 to 6 inches wide, and the extreme height of the cover in cross-section may be half its extreme width when manufactured from 7 to 8 inches wide, and the extreme height of the cover in cross-section may be considerably less than half its width when manufactured over 8 inches wide, and the arc of a circle foundation 19 is preferably manufactured in dimensions less than a semi-circle.

The tire is constructed having an abnormally strong and preferably thin supple foundation 20, which foundation may be manufactured from woven cord and be endless and abnormally strong in every direction. It is to be specially noted that there are many fewer cubic inches of cord foundation 20 in this type of tire than in existing types of inflated tires of similar widths and diameters, manufactured to carry similar loads. In this tire each abnormally strong foundation 20 is less than a semi-circle and has suitable right and left inextensible base beads 4 and 5, between which base beads a suitable unstretchable endless distance piece 21 may lie, if required, which when used keys the base beads 4 and 5 to the metal bed circumference of the wheel.

This tire has no straight walls or belly part, independent of its wide gable-like tread 2 and 3, as in existing types of inflated tires. In fact the whole of the tire cover, with the exception of its suitable inextensible base beads 4 and 5, is a shock-absorbing tread which is ever changing in effective width when in use, according to the load carried, shock received, or ground travelled over, see Figures 1, 2 and 3. The extreme rims or flanges 6 and 7 of the wheel, which I will call the tire retaining rims or flanges, are smooth rounded flanges which extend outwards from the metal bed circumference of the wheel, over which metal bed circumference 10 the base beads 4 and 5 of the tire are snugly fitted, and under load the smooth rounded flanges of the wheel may come into contact with the extreme right and left edges of the tire, without causing any injury to the tire.

In this type of tire cover abnormal flexing takes place adjacent to the tire's centre line 9 without injury to the tire's strong foundation 20, because the tire's foundation (being less than a semi-circle) is easily bent back or reversed by the apex or extreme outer circumference 8 of the tire coming into road contact, and under all conditions of road work the supple apex or extreme circumference 8 of the tire comes first into road contact, see Figure 1, and remains in close and biting contact with the road, even when the tire is overloaded or under-inflated, see Figures 2 and 3, or when the tire increases its effective width abnormally, see Figures 2 and 3.

The extreme supple apex 8 of the tread when it comes into road contact causes the abnormally strong cord foundation 20 of the tire cover to be bent back or reversed without developing objectionable friction, see Figures 2 and 3, and curbstones cannot injure the right and left edges or sides 2 and 3 of the tire cover as in existing inflated tire covers, because the widest part of the air chamber has a comparatively thick wall to protect it, instead of a thin wall as in existing types of inflated tires, but this thick wall does not interfere with the abnormal flexing of the tire in road contact, see Figures 2 and 3.

This tire is constructed practically unburstable, and if from any cause it becomes deflated when running on the road, the wheel of the chassis to which the tire is attached, cannot drop more than say about the maximum give of the tire in road contact, which may be from say 1 to 2 inches, according to the width of tire used, but the height or depth in cross-section of the air chamber even when the tire is 12 inches wide or more, is only about 2 inches. This tire can be run on, if deflated, until it reaches the end of its journey, see Figure 3, and as deflation does not seriously affect the steering of the chassis, the lives of passengers are not risked owing to deflation. With this type of inflated tire attached a great saving can be effected in the running costs of practically all types of commercial chassis.

Another important feature about this type of tire is that it is capable of being run at lower air pressures than existing types of giant pneumatic tires of similar widths and diameters, and an enormous saving is effected in the cost of manufacture, particularly in widths from say 8 to 12 inches or more, as compared with the cost of manufacturing existing types of giant inflated tires, as manufactured in U. S. A., of similar widths and diameters.

This type of tire may be used to replace existing types of solid rubber band tires on commercial chassis, and on account of the height of this tire in cross-section being less than half its width in the widest sections, similar wheel diameters as are used at present for solid rubber band tires may be used with these tires, so that it is not necessary to alter the design and dimensions of existing types of brake-drums and hubs, or alter the gear ratio types of chassis when replacing solid rubber band tires with this inflated type of tire.

When this type of tire is fitted to a commercial chassis instead of existing solid rubber band tires, its speed and range of movement per day is increased, particularly when travelling over bad or pot-holey roads, and this type of tire will save the premature breaking-up of roads, because of its ability to spread abnormally circumferentially, and laterally as and when required, according to the load carried or shock received.

In this type of tire the height of the air-chamber in the tire's cross-section prevents the wheel and tire ever being let down seriously, no matter what the width of the tire may be, if the tire ever becomes deflated when running on the road, see Figure 3. Any suitable type of air tube and air valve may be used in this inflated tire and a saving in first cost is also effected in manufacturing the air tube 22, as well as in the tire cover 1 because of its small height compared with its width in cross-section.

These tires may be constructed in all required dimensions and of suitable materials.

Claims.

1. An inflated tire constructed without a belly part with a wide gable-like tread which is the widest part of the tire and forms the whole of the tire's cover with the exception of its right and left inextensible base beads, the gable-like tread having suitable endless grooves and cavities and a flexible blunt narrow extreme treading circumference or apex formed on and adjacent to the tire's centre-line.

2. A pneumatic tire having inextensible base beads at its sides arranged to bear directly against a wheel rim and an abnormally strong arcuate fabric or cord foundation less than a semi-circle, and also having a gable-like tread forming the widest part of the tire and terminating at the sides short of said base beads, said tread having endless grooves and cavities, and a flexible blunt narrow extreme centrally arranged treading portion.

3. A pneumatic tire having inextensible base beads at its sides arranged to bear directly against a wheel rim and an abnormally strong arcuate fabric or cord foundation less than a semi-circle, and also having a gable-like tread forming the widest part of the tire and terminating at the sides short of said base beads, said tread having endless grooves and cavities, and a flexible blunt narrow extreme centrally arranged treading portion, in combination with a wheel rim presenting a cross-sectionally flat outer periphery against which the said base beads bear, and outwardly extending side flanges.

4. A tire casing comprising a flexible foundation, arcuate in cross section and less than a semi-circle and having inextensible base beads, and an outer cover on said foundation and approximately triangular in cross-section and extending on said foundation from side to side, said cover having a blunt narrow extreme apex on its center line and endless grooves spaced apart and arranged on the portions of the tread of the cover between said blunt apex and the sides, the sides of said grooves being angularly related when the tire is in normal condition and forming step-like annular shoulders on the tread of the tire.

In testimony whereof I affix my signature in presence of two witnesses.

EDWARD BRICE KILLEN.

Witnesses:
 JOHN LIDDLE,
 JOHN TRAIN LIDDLE.